United States Patent
Chirgwin et al.

(10) Patent No.: US 9,483,392 B1
(45) Date of Patent: **\*Nov. 1, 2016**

(54) RESOURCE-CONSTRAINED TEST AUTOMATION

(71) Applicant: International Business Machines Corporation, Armonk, NY (US)

(72) Inventors: Matthew W. Chirgwin, Eastleigh (GB); Amy Gilbrook, Hursley (GB); Bernard Z. Kufluk, Hampshire (GB); Ainhoa G. Larumbe, Hampshire (GB); Jason K. Yong, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,921

(22) Filed: May 18, 2016

Related U.S. Application Data

(63) Continuation of application No. 15/063,292, filed on Mar. 7, 2016, now Pat. No. 9,405,661, which is a continuation of application No. 14/693,955, filed on Apr. 23, 2015.

(51) Int. Cl.
    *G06F 11/00* (2006.01)
    *G06F 11/36* (2006.01)

(52) U.S. Cl.
    CPC ................ *G06F 11/3688* (2013.01)

(58) Field of Classification Search
    CPC ...... G06F 11/36–11/3696; G06F 11/22–11/28
    See application file for complete search history.

(56) References Cited

U.S. PATENT DOCUMENTS

| | | | |
|---|---|---|---|
| 8,056,060 B2 | 11/2011 | Bicheno et al. | |
| 8,539,282 B1 | 9/2013 | Kabanov et al. | |
| 8,990,639 B1 * | 3/2015 | Marr | G06F 11/30 714/25 |
| 8,997,052 B2 | 3/2015 | Bhagavatula | |
| 9,244,818 B1 * | 1/2016 | Paleja | G06F 21/50 |
| 2009/0265693 A1 | 10/2009 | Bakowski | |

(Continued)

FOREIGN PATENT DOCUMENTS

CN  104516815 A  4/2015

OTHER PUBLICATIONS

Walcott-Justice, "Testing in Resource-Constrained Environments," A Dissertation Presented to the Faculty of the School of Engineering and Applied Science, University of Virginia, May 2012, pp. 1-163.

(Continued)

*Primary Examiner* — Jason Bryan
(74) *Attorney, Agent, or Firm* — David Zwick

(57) ABSTRACT

Automating testing of a software product under system resource constraints. One or more SQAs are received and, for each SQA, a confidence level and an importance are received. For one or more system resources, an amount of each system resource available for testing is received. Each amount of system resource available for testing is apportioned to the SQAs, based on the confidence level and the importance of each SQA. Each test in a set of tests is prioritized, based on the number of SQAs associated with the test and any previous results of the test. For each SQA, a subset of the set of tests is selected, based on the test priorities, an expected consumption of system resources by each test, and the apportionment of the system resources to the SQA; the selected subset of tests is executed; and the test results for the selected subset of tests is updated.

1 Claim, 6 Drawing Sheets

(56) References Cited

U.S. PATENT DOCUMENTS

| | | | |
|---|---|---|---|
| 2011/0145653 A1* | 6/2011 | Broadfoot | G06F 11/3604 714/38.1 |
| 2012/0266023 A1* | 10/2012 | Brown | G06F 11/3684 714/32 |
| 2013/0055029 A1 | 2/2013 | Lawrance et al. | |
| 2013/0174178 A1 | 7/2013 | Chakraborty et al. | |
| 2014/0281719 A1 | 9/2014 | Zlotnick | |

OTHER PUBLICATIONS

Walcott-Justice, "Testing in Resource-Constrained Environments," A Dissertation Presented to the Faculty of the School of Engineering and Applied Science, University of Virginia, May 2012, pp. 1-163.

Nagar et al., "Implementing Test Case Selection and Reduction Techniques Using Meta-Heuristics," Confluence The Next Generation Information Technology Summit, 2014 5th International Conference, Sep. 25-26, 2014, IEEE Xplore Digital Library, pp. 837-842.

Rajarathinam et al., "Test Suite Prioritisation Using Trace Events Technique," IET Software, vol. 7, Issue 2, Apr. 2013, pp. 85-92.

Akçay et al., "A Greedy Algorithm for the General Multidimensional Knapsack Problem," Annals of Operations Research, Mar. 2007, vol. 150, Issue 1, pp. 1-16.

Koçak et al., "Evaluation of Software Product Quality Attributes and Environmental Attributes using ANP Decision Framework," IEEE Proceedings, RE4SuSy@RE'14, 2014, pp. 1-8.

Mell et al., "The NIST Definition of Cloud Computing," National Institute of Standards and Technology, Information Technology Laboratory, Version 15, Oct. 7, 2009, pp. 1-2.

Pending U.S. Appl. No. 14/693,955, filed Apr. 23, 2015, Entitled: "Resource-Contrained Test Automation", pp. 1-43.

Pending U.S. Appl. No. 15/063,292, filed Mar. 7, 2016, Entitled: "Resource-Constrained Test Automation", pp. 1-36.

IBM, List of IBM Patents or Patent Applications Treated as Related, Appendix P, dated Jul. 13, 2016, 2 pages.

\* cited by examiner

RESOURCE-CONSTRAINED TEST AUTOMATION

BACKGROUND

The present invention relates generally to the field of computer-implemented software testing, and more particularly to automated testing of software under system resource constraints.

Software testing is the process of analyzing a software product to detect differences between existing and desired conditions, for example, defects, errors, or bugs, and to evaluate design features of the software product. In test automation, the software testing is performed by separate testing software in a computing environment. A test corresponds to a particular set of inputs to the software, including data and parameters, and conditions under which the software to be tested is executed, which are designed to determine whether one or more features of the software are working as desired. A test suite is a collection of tests used to test a software product.

In certain software development environments, a scarcity of system resources may constrain the ability to run all tests in a test suite. Typically, it is the amount of time available for testing that is limited. However, for example in mobile device testing, resources such as memory or power may be limited. Under these conditions, it may be desirable to select a subset of the tests that approaches the effectiveness of testing with the entire test suite. The execution of all or some of the tests in a test suite may be referred to as a test run.

SUMMARY

Embodiments of the present invention disclose a computer-implemented method, computer program product, and system for automating testing of a software product under system resource constraints. One or more software quality attributes (SQAs) are received, and, for each SQA, a confidence level and an importance are received. For one or more system resources, an amount of each system resource available for testing is received. Each amount of system resource available for testing is apportioned to the SQAs, based on the confidence level and the importance of each SQA. Each test in a set of tests is prioritized, based on the number of SQAs associated with the test and any previous results of the test. For each SQA, a subset of the set of tests is selected, based on the test priorities, an expected consumption of system resources by each test, and the apportionment of the system resources to the SQA; the selected subset of tests is executed; and the test results for the selected subset of tests is updated.

DETAILED DESCRIPTION

Figure 1:
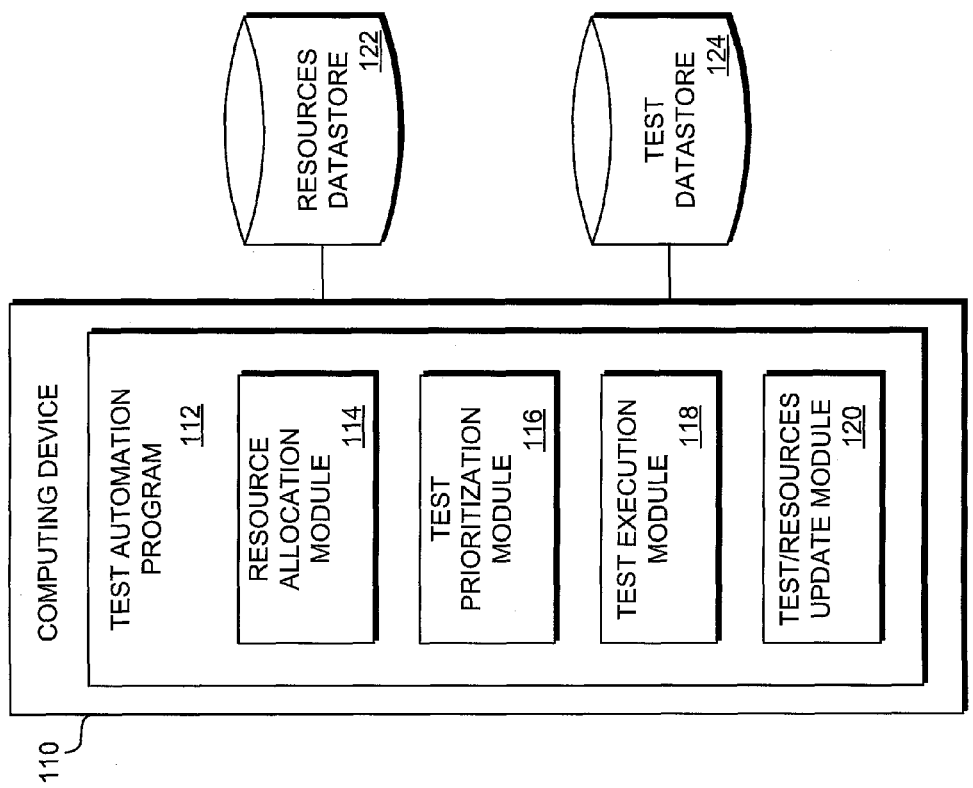
FIG. 1 depicts a functional block diagram of a test automation (TA) system, in accordance with an embodiment of the present invention.

Embodiments of the present invention are directed to test automation (TA) systems that utilize confidence levels and other testing indicators to allocate system resources available for testing to predetermined target test areas, or software quality attributes (SQAs). Such system resources may include time, memory, or power. The TA system may further prioritize tests, and execute tests associated with a particular SQA based on their priority, while not exceeding the resources allocated to the SQA.

A typical example of software testing is regression testing, which seeks to find defects after a code change has occurred. Specifically, it seeks to uncover any degraded or lost features, including old bugs that may have reappeared. Regression occurs whenever software functionality that was previously working correctly stops working as intended as a result of the code change. Thus, as development and maintenance of a software product proceeds, the size of a test suite devoted to regression testing also grows, which may make it infeasible for a TA system to run all tests in a test suite within existing resource constraints.

In addition to regression testing, test automation may be used to test software from the standpoint of performance, load, or stress. In a load test, for example, a TA system may simulate a large number of concurrent users in order to evaluate the performance of the software under expected conditions of heavy load. A stress test may be designed to understand the upper limits of capacity within the system and determine the system's robustness in terms of extreme load.

In software testing, code coverage measures the extent to which the source code of a software product is tested by a test suite. Greater code coverage generally implies more thorough testing and a higher likelihood of discovering software defects. Code coverage may include function coverage, statement coverage, decision coverage, and path coverage, which indicate the percentage of subroutines, statements, decision branches, and code paths, respectively, executed by the test suite. Full code coverage, especially of code paths or decision branches, is usually impractical or impossible. However, code coverage analysis software may provide input to TA systems for increasing the code coverage in targeted SQAs.

Software quality generally refers to functional quality or structural quality. Functional quality attributes reflect how well the software complies or conforms to a given design, based on functional requirements or specifications that define specific behaviors. Structural quality refers to how the software meets non-functional requirements that support the delivery of the functional requirements, such as robustness or maintainability. Functional quality is typically measured through software testing. As mentioned above, certain aspects of structural quality, such as robustness, may also be measured via software testing.

SQAs are factors that affect run-time behavior, system design, and user experience of a software product, and generally reflect functional or structural quality attributes of the software. Examples of SQAs include reliability, usability, efficiency, and portability. The importance or priority of each SQA may differ from system to system.

Tests in a test suite may be associated with one or more SQAs, which the test is designed to target. The SQAs represent the areas of greatest concern, which have the potential for application-wide impact.

In an embodiment of the invention, one or more numerical values, indicating an estimate of the amount of testing needed, may be associated with each SQA. These numerical values are referred to as testing indicators. Examples of testing indicators include a confidence level, C, representing a level of certainty that an SQA achieves a specified level of quality, and an importance, I, of an SQA for the software product. For example, in an embodiment of the invention, importance I of an SQA may be an integer between 0 and 100. Importance I may be based on factors such as the relative impact of the SQA to the overall quality of the software product and its business value. Confidence level C for an SQA may be, for example, a value between −1 and 5, with −1 representing an unknown confidence level, if, for example, no relevant development work or no testing has been done; 0 representing no confidence, for example, if all associated tests failed, despite development work having been completed; and 5, representing full confidence, for example, if all development work has been completed and all associated tests passed, with no features to be tested thought to have been missed in the SQA. C may be based on several factors, for example, automated test results, additional manual test results, amount of testing completed, proportion of development work completed to time remaining for its completion. User input may also play a role in setting a confidence level. Testing indicators may be combined in a formula that apportions available system resources among the SQAs.

In an embodiment of the invention, project management tools, such as Gantt charts, indicating the current status of development work in SQAs of the software product, may contribute data that may be used in setting confidence and importance levels, or other testing indicators, for an SQA.

FIG. 1 is a functional block diagram of a TA system 100, in accordance with an embodiment of the present invention. TA system 100 includes computing device 110, which further includes TA program 112. Computing device 110 represents the computing environment or platform that hosts TA program 112. In various embodiments, computing device 110 may be a laptop computer, netbook computer, personal computer (PC), a desktop computer, or any programmable electronic device capable of hosting TA program 112, in accordance with embodiments of the invention. Computing device 110 may include internal and external hardware components, as depicted and described in further detail below with reference to FIG. 3. In other embodiments, computing device 110 may represent a cloud computing environment, as described in relation to FIGS. 4, 5, and 6, below.

TA program 112 operates generally to utilize testing indicators to allocate system resources available for testing, such as time or memory, to predefined SQAs; prioritize tests associated with the SQAs; and execute the tests based on their priority, without exceeding the resources allocated to the SQA. TA program 112 may include resource allocation module 114, test prioritization module 116, test execution module 118, test/resources update module 120, resources datastore 122, and test datastore 124.

Figure 3:
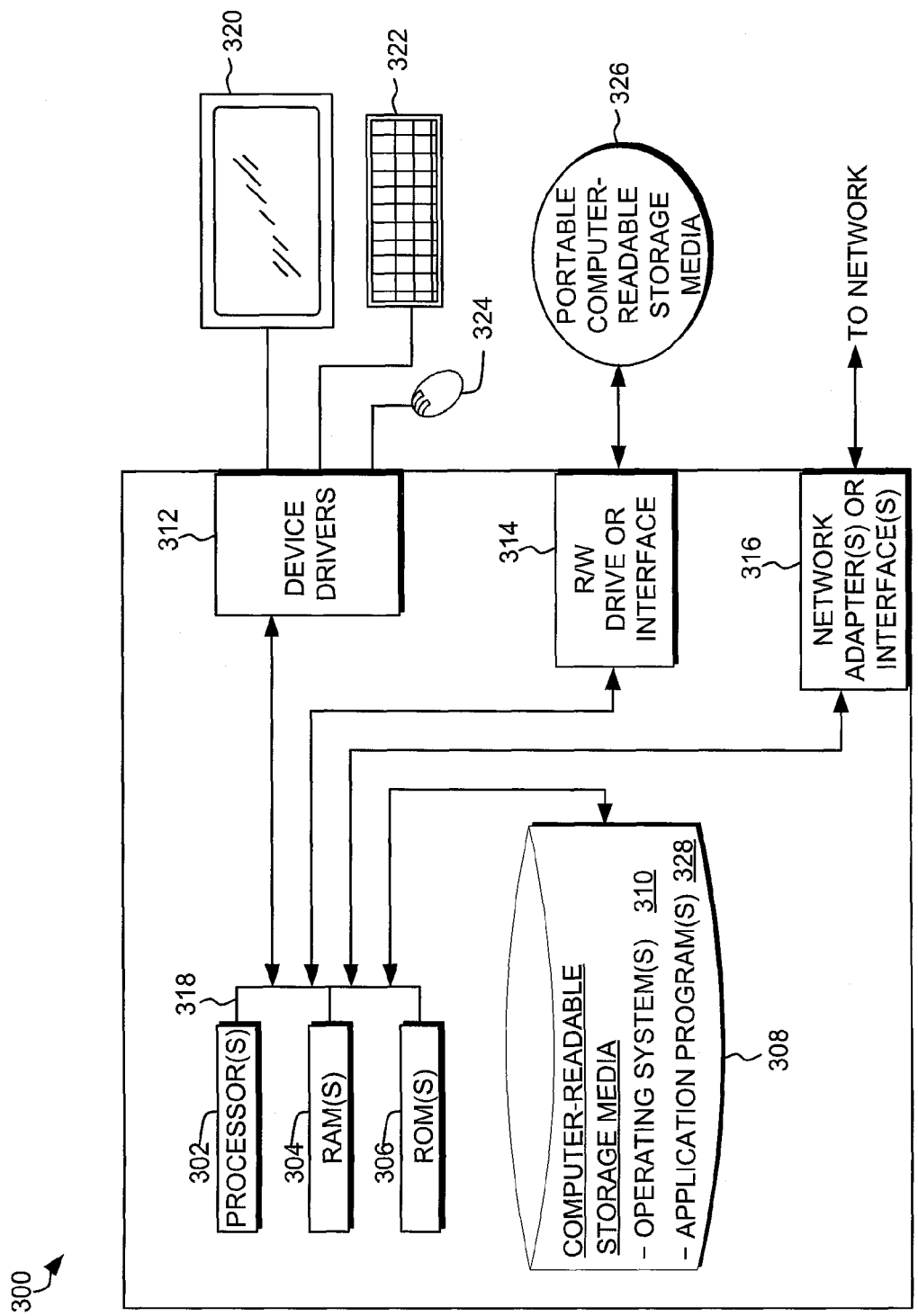
FIG. 3 is a functional block diagram of a data processing environment, in accordance with an embodiment of the present invention.

Resources datastore 122 represents a store of information about system resources and SQAs targeted by TA program 112, in an embodiment of the invention. Information about system resources may include the type of each constrained system resource and the amount of the resource available for testing. Information about SQAs may include, for example, testing indicators such as I, indicating the importance of the SQA for the software product, and confidence level, C, indicating a certainty that the software product achieves a desired level of quality relative to an SQA. Resources datastore 122 may reside, for example, on computer readable storage media 308 (FIG. 3). Resources datastore 122 may be initialized, for example, with manually entered data and may be updated during the execution of TA program 112 by test/resources update module 120, as described below.

Test datastore 124 represents a datastore of tests. As described above, the tests may include regression tests, load tests, and tests for code coverage. Test datastore 124 may also represent a store of information about individual tests. Such information may include static information, such as the SQAs associated with the test, as well as information about the test that is updated after each execution, such as its expected resource consumption; whether it passed the last time it ran; how many runs ago the test was last run, i.e., was included in a test run; and whether the test is blocked, i.e., marked for exclusion from a test run. Test datastore 124 may reside, for example, on computer readable storage media 308 (FIG. 3).

In various embodiments of the invention, resource allocation module 114 operates generally to receive information about available system resources, for example, from resources datastore 122, and apportion the resources among the SQAs. For example, where the constrained resource is time available for testing, resource allocation module 114 may apportion the total time among SQAs, for example, as shown in Table 1, based on testing indicator I, C, and a calculated SQA value a, which is a number indicating the value of an SQA relative to the other SQAs. For example, a may be defined by the formula: $a=I(10-C)$. In this formula, a is proportional to I and is in an inverse relation to C, i.e., a increases with I and decreases with C. As mentioned above, C may be negative. Total SQA value, A, is the sum of all individual SQA values a. Total time, T, is the total time available to run tests. Time allocated, t, is the time allotted for executing tests associated to an SQA. For example, allocating test time to SQAs according to the formula $t=(a/A)T$ guarantees that the sum of the times allocated to all SQAs equals T.

TABLE 1

ALLOCATE TIME TO SQA'S

| SQA | Importance (I) | Confidence (C) | SQA Value (a) | Time Allotted (t) |
|---|---|---|---|---|
| Security | 100 | 3 | 700 | 90.000 |
| Reliability | 50 | 4 | 300 | 38.571 |
| Efficiency | 30 | 5 | 150 | 19.286 |
| Error Recovery | 10 | −1 | 110 | 14.143 |
| Portability | 10 | 1 | 90 | 11.571 |
| Scalability | 10 | 5 | 50 | 6.429 |
| Total | | | A = 1400 | T = 180 |

In embodiments in which multiple system resources may be constrained, such as test execution time and memory, resource allocation module 114 may allocate the resources to SQAs, such that the same formula is used for each resource, or such that multiple formulas are used in apportioning the resources. For example, in one embodiment, if both time and memory are constrained system resources, memory may be allocated to an SQA in the same proportion as time, for example as in Table 1, according to $m=(a/A)M$, where a and A are defined as before and M is the total memory available. In another embodiment, a formula other than the formula a=I(10−C) used to determine SQA values with respect to time may be used for system memory.

In various embodiments of the invention, test prioritization module 116 operates generally to assign priorities to tests, based on information about the tests, received, for example, from test datastore 124. Test prioritization module may transmit test priorities to test execution module 118 to facilitate selection and execution of tests within the resources allocated to SQAs by resource allocation module 114.

Test prioritization module 116 may prioritize tests, for example as illustrated in Table 2. Test prioritization may be based on various factors, such as whether the last execution of a test passed or failed and how long ago a test was last run. In Table 2, for example, test priority may be determined by the following equation:

test priority=passed*last run*blocked*number of SQAs*weighting factor where passed=1 if a test last passed, passed=2 if it last failed; last ran is the number of runs ago a test was last run; blocked=0 or 1, depending on whether a test should be excluded or not, for example if it has been determined to be faulty; and number of SQAs is the number of SQAs associated with the test. If some SQAs associated with the test are more or less important, the weighting factor may be included in the formula.

TABLE 2

PRIORITIZE TESTS

| Test | Passed Last Time | Runs Ago Last Ran | Blocked | SQAs | Execution Time | Priority |
|---|---|---|---|---|---|---|
| 1 | Yes | 1 | No | Security | 5 | 1 |
| 2 | No | 2 | No | Reliability, Efficiency | 2 | 8 |
| 3 | Yes | 1 | No | Error Recovery | 3 | 1 |

In embodiments in which multiple resources may be constrained, such as test execution time and memory, test prioritization module 116 may consider the type and/or amount of each resource required by a test, when prioritizing tests. For example, a formula to compute test priorities may include a weighting factor related to the type of resource that a test consumes.

Test execution module 118 operates generally to receive prioritized tests from test prioritization module 116, as well as an apportionment of available system resources among the SQAs from resource allocation module 114, and to select and execute tests associated with each SQA, based on the test priorities, the expected consumption of system resources by the tests, and the amount of each resource apportioned to the SQA. Test execution module 118 may also report results from the tests and transmit this information to test/resources update module 120.

For example, in an embodiment of the invention, test execution module 118 may successively execute the highest priority test remaining that does not exceed any of the still available constrained resources.

In other embodiments, test execution module 118 may select and execute tests based on one or more known priority-based job scheduling algorithms that account for resource constraints.

In other embodiments, test execution module 118 may attempt to select a subset of tests associated to an SQA whose total consumption of each resource does not exceed the amount allocated to the SQA, such that the sum of the test priorities is maximal. If only one system resource is constrained, then this is an example of a 0-1 knapsack problem, which, for example, for execution time, may be written in the form:

$$\text{maximize} \sum_{j=1}^{n} s_j p_j$$

$$\text{subject to} \sum_{j=1}^{n} s_j t_j \leq T$$

where $s_j=0$ or 1, $p_j$ are the test priorities, $t_j$ are the test execution times, and T is the total amount of time available for testing, for $j=1, \ldots, n$. As exact solutions to knapsack problems tend to be time-consuming, heuristic approaches are generally used. For example, tests may be selected in order of highest to lowest ratio of their priority to their execution time, so long as the total execution time is not exceeded.

In some embodiments of the invention, in which multiple system resources are constrained, the problem of selecting and executing a subset of tests associated to an SQA whose total consumption of each resource does not exceed the amount allocated to the SQA, such that the sum of the test priorities is maximal, is an example of a multidimensional 0-1 knapsack problem. Such problems may be written in the form:

$$\text{maximize} \sum_{j=1}^{n} s_j p_j$$

$$\text{subject to} \sum_{j=1}^{n} s_j r_{ij} \leq R_i$$

where $s_j=0$ or 1, $p_j$ are the test priorities, $r_{ij}$ represent the individual amount of the ith resource allotted to the jth test, and $R_i$ is the total amount of the ith resource available for testing, for $j=1, \ldots, n$. Multidimensional 0-1 knapsack problems are also generally solved via heuristic approaches. For example, tests may be selected in order of highest to lowest ratio of their priority to their aggregate resource consumption, so long as the total of each resource does not exceed the amount of the resource still available. Aggregate resource consumption is defined as:

$$\sum_i \frac{\overline{R}_i}{r_{ij}}$$

where $\overline{R}_i$ is the remaining amount of the ith resource. Alternatively, tests may be selected in order of highest to lowest product of their priority with their effective capacity, defined as:

$$\min_i \left\{ \frac{\overline{R}_i}{r_{ij}} \right\}$$

where $r_{ij}$ and $\overline{R}_i$ are defined as before.

In other embodiments, test execution module 118 may consider other factors, such as precedence constraints, in selecting a test to be executed. For example, the determination whether to run a first test may depend on the results of a second test, in which case the second test may be scheduled to run first.

In certain embodiments, test execution module 118 may dynamically schedule tests, or modify a preselected set of tests, based on the actual amount of each constrained system resource that may become available when each test in a test run completes.

Figure 5:
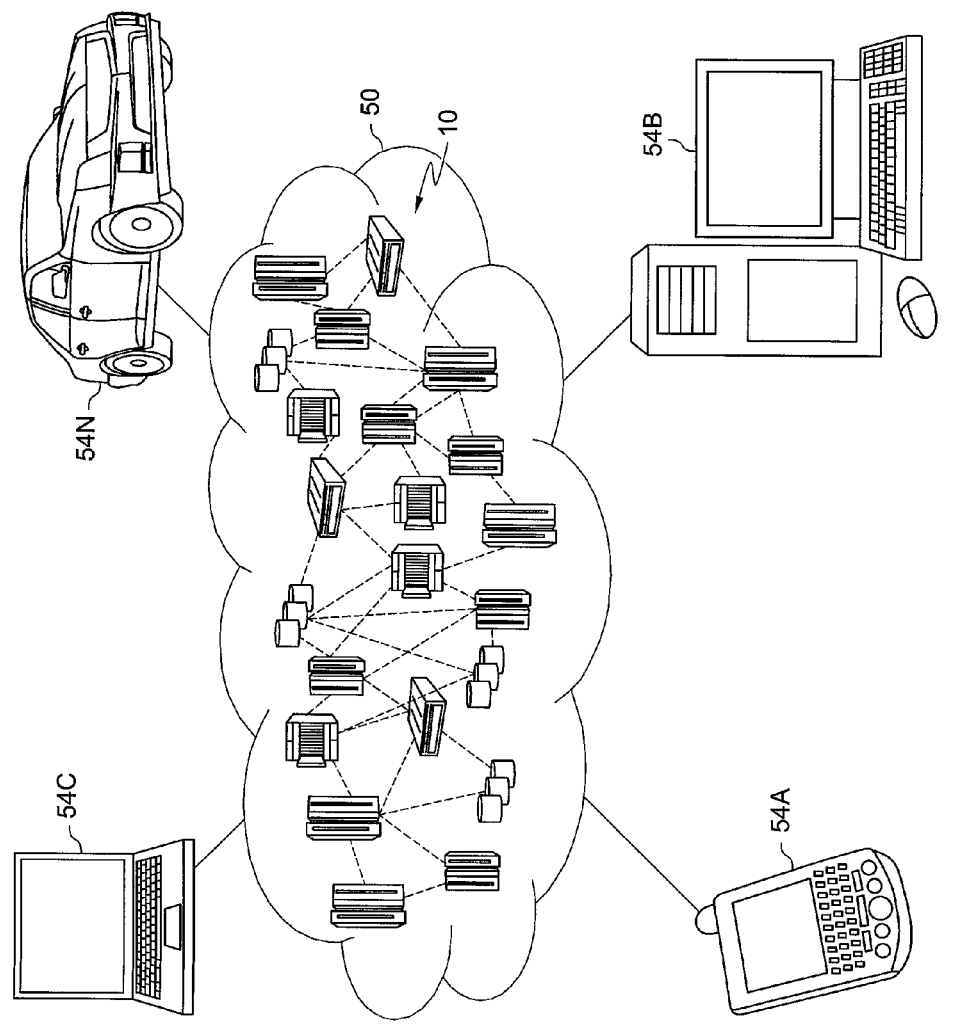
FIG. 5 depicts a cloud computing environment according to an embodiment of the present invention.

Test execution module 118 may output a report, listing the tests that were selected to be executed and the test results. The report may be saved in test datastore 124 and may be transmitted by TA program 112, for example, to a cloud computing node 10 (FIG. 5).

In an embodiment of the invention, test/resources update module 120 operates to receive test results from test execution module 118 and update information about tests and/or resources, for example, in resources datastore 122 or test datastore 124. For example, after a test is run, test/resources update module 120 may update factors in test datastore 124 used by test prioritization module 116 to prioritize the test. The updated factors may then be used by test execution module 118 in the same test run or in subsequent test runs. Test/resources update module 120 may also update a test's expected resource consumption. Test/Resources update module 120 may also record the actual amount of each constrained resource remaining, for example, in resources datastore 122, for use by test execution module 118 in selecting tests.

In some embodiments, test/resources update module 120 may use feedback from the testing to modify the testing indicators in resources datastore 122, for example, by updating confidence levels according to test pass/fail rates.

In some embodiments, test/resources update module 120 may operate in conjunction with test execution module 118 to dynamically modify test priorities and/or testing indicators during a test run. For example, by setting the "runs ago last run" value of Test 2 in Table 2 to 1 after running the test with regard to SQA Reliability, its priority with regard to SQA Efficiency may be decreased.

Figure 2:
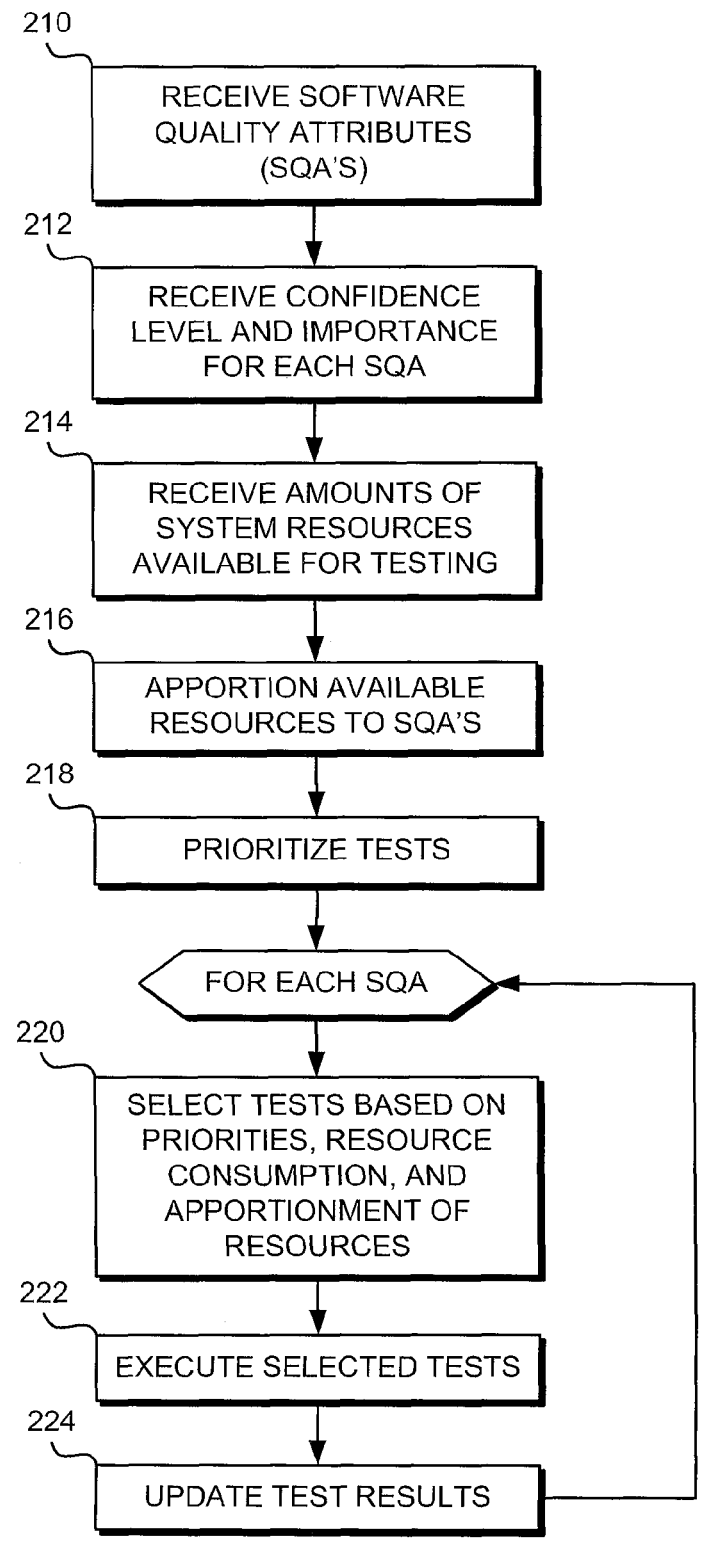
FIG. 2 is a flowchart depicting operational steps of a TA program, in accordance with an embodiment of the present invention.

FIG. 2 is a flowchart depicting operational steps of TA program 112, in accordance with an exemplary embodiment of the invention. TA program 112 may receive one or more SQAs (step 210) from resources datastore 122. For each SQA, TA program 112 may receive, from resources datastore 122, a confidence level and an importance (step 212). For one or more system resources, TA program 112 may receive, from resources datastore 122, an amount of each system resource available for testing (step 214). Resource allocation module 114 may apportion available resources among the SQAs, based on the their confidence level and importance (step 216). Test prioritization module 116 may prioritize each test in a set of tests, based on the number of SQAs associated with the test, and any previous test results of the test, retrieved from test datastore 124 (step 218). For each SQA, test execution module 118 may select tests associated with the SQA, based on their priorities set by test prioritization module 116 (step 218), their expected resource consumption from test datastore 124, and the apportionment of resources to the SQA from resources datastore 122 (step 220). Test execution module 118 may execute the selected tests (step 222). Test/resources update module 120 may update the test results in test datastore 124 for the selected tests (step 224).

FIG. 3 depicts a block diagram 300 of components of computing device 110 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 328, for example, TA program 112, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other non-transitory, computer-readable, tangible storage device, which can store a computer program and digital information.

Computing device 110 may also include a R/W drive or interface 314 to read from and write to one or more portable computer readable storage media 326. Application programs 328 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 328 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
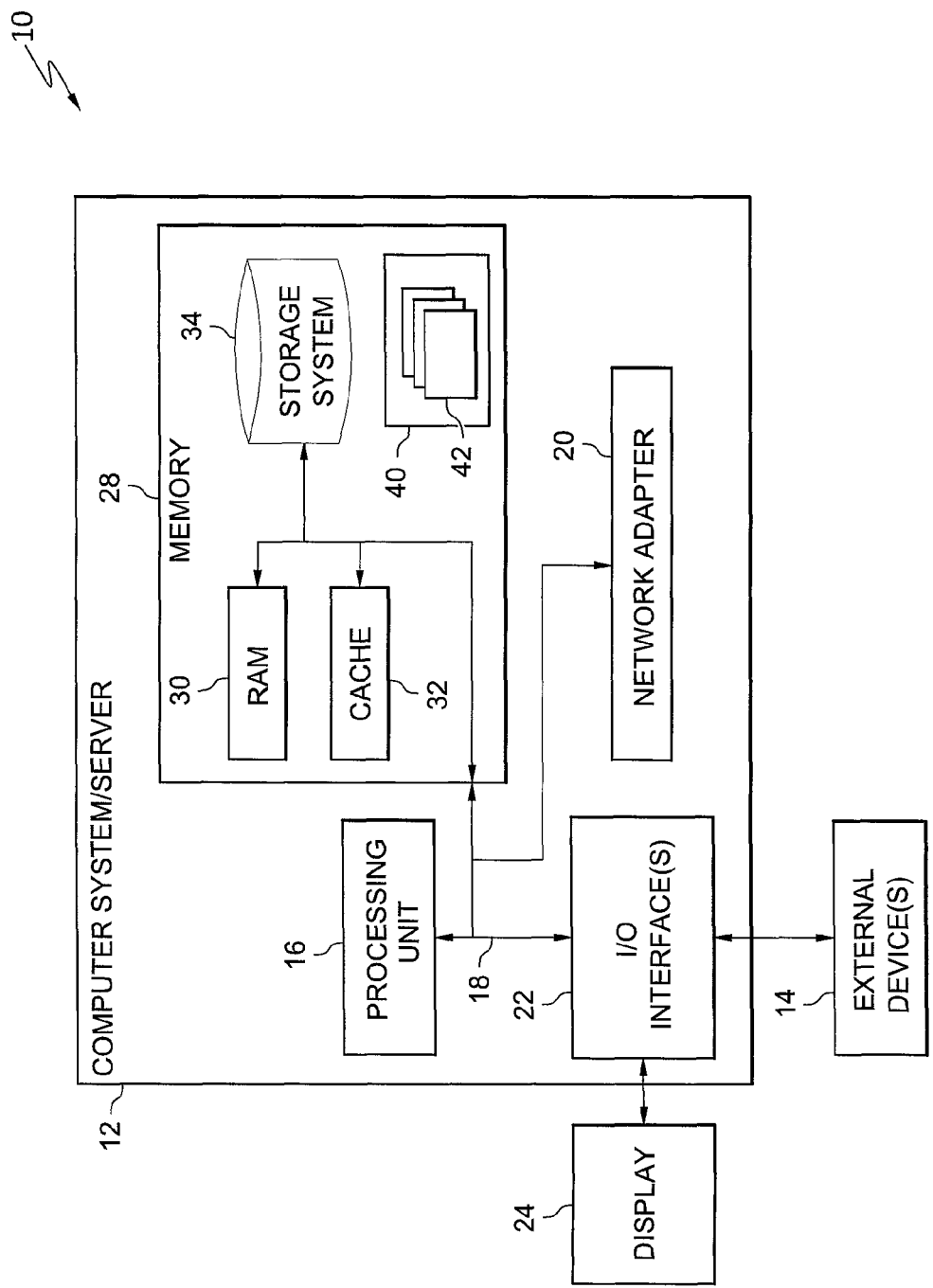
FIG. 4 is a functional block diagram of a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
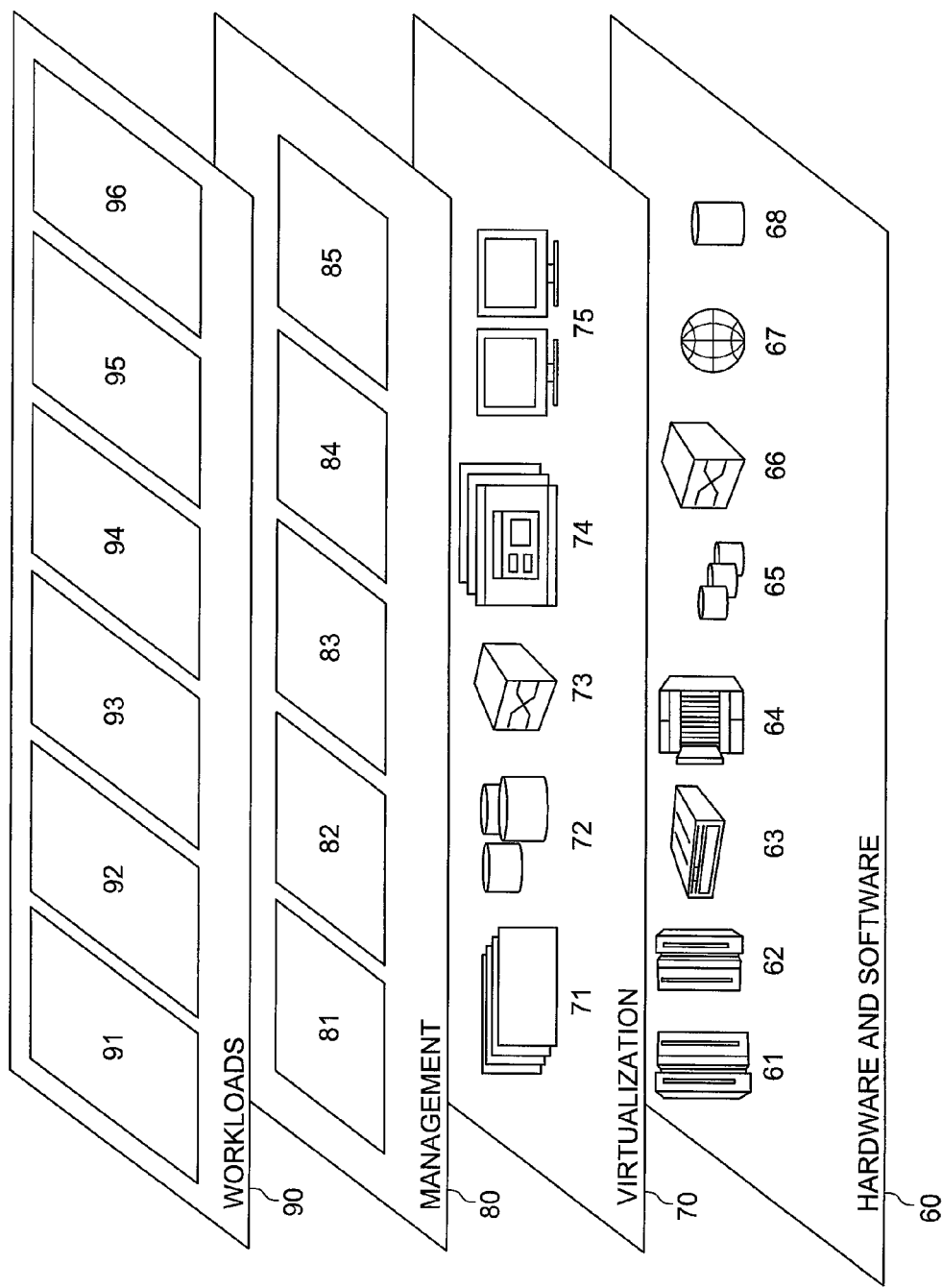
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test automation 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer program product for automating testing of a software product under system resource constraints, the computer program product comprising one or more computer readable storage media and program instructions stored on the one or more computer readable storage media, the program instructions executable by a computer to cause the computer to perform a method comprising:

receiving one or more software quality attributes (SQAs) and, for each SQA, a confidence level and an importance;

receiving, for one or more system resources, an amount of each system resource available for testing;

apportioning each amount of system resource available for testing to the SQAs in an amount proportional to the importance of the SQA and in an inverse relation to the confidence level of the SQA;

assigning, to each test in a set of tests, a priority based on the number of SQAs associated with the test and any previous results of the test;

for each SQA:
  selecting a subset of tests associated with the SQA from the set of tests by solving a multidimensional 0-1 knapsack problem that maximizes the sum of the priorities of tests in the selected subset of tests, such that, for each system resource available for testing, the total expected consumption of the system resource by the tests in the selected subset of tests does not exceed the amount of the system resource apportioned to the SQA;
  executing the selected subset of tests; and
  updating the test results for the selected subset of tests; and updating confidence levels based on the test results for the selected subset of tests.

* * * * *